(12) United States Patent
Zou et al.

(10) Patent No.: US 8,665,925 B2
(45) Date of Patent: Mar. 4, 2014

(54) METHOD AND DEVICE FOR GENERATING SCRAMBLING CODE

(75) Inventors: Fei Zou, Shenzhen (CN); Liguo Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 153 days.

(21) Appl. No.: 13/388,706

(22) PCT Filed: Jun. 13, 2010

(86) PCT No.: PCT/CN2010/073970
§ 371 (c)(1),
(2), (4) Date: Feb. 3, 2012

(87) PCT Pub. No.: WO2011/017977
PCT Pub. Date: Feb. 17, 2011

(65) Prior Publication Data
US 2012/0128096 A1    May 24, 2012

(30) Foreign Application Priority Data

Aug. 12, 2009 (CN) .......................... 2009 1 0165649

(51) Int. Cl.
*H04B 1/00* (2006.01)
(52) U.S. Cl.
USPC ........... 375/130; 375/135; 375/136; 375/137; 375/295; 375/316
(58) Field of Classification Search
CPC ......... H04J 14/08; H04J 3/047; H04J 13/105; H04J 11/00; H04J 13/00; H04B 1/711; H04L 25/03866; H04L 25/03872; H04L 27/2613; H04L 27/2617; H04L 27/2656; H04L 27/2657; H04L 9/0662; H04L 1/1607

USPC ......... 375/130, 131, 135–137, 140, 146–147, 375/149, 219, 223, 295, 299, 316, 322
See application file for complete search history.

(56) References Cited

U.S. PATENT DOCUMENTS 4,755,987 A * 7/1988 Lee et al. ...................... 370/479
7,436,963 B2 * 10/2008 Lo Iacono et al. ............ 380/268

(Continued)

FOREIGN PATENT DOCUMENTS

CN       1691656 A    11/2005
CN     101018097 A     8/2007

(Continued)

OTHER PUBLICATIONS

International Search Report (in Chinese with English translation) for PCT/CN2010/073970, mailed Sep. 23, 2010; ISA/CN.

*Primary Examiner* — Hirdepal Singh
(74) *Attorney, Agent, or Firm* — Harness, Dickey & Pierce, PLC

(57) ABSTRACT

The present invention discloses a method and apparatus for generating a scrambling code, and the method includes: acquiring initial sequences X0, Y0; extending the initial sequences X0, Y0 for ($\lfloor N/M \rfloor$+1) times, and obtaining extended sequences X*, Y*, wherein, the N is a positive integer, 0<M≤22, and "$\lfloor \ \rfloor$" denotes rounded down; acquiring phase offset column vectors; and generating the scrambling code according to the extended sequences X*, Y* and the phase offset column vectors. The apparatus includes: a first acquiring module, an extension module, a second acquiring module and a generation module. The technical scheme of the present invention can process more users, reduce the processing delay and greatly improve the processing efficiency in the same system clock.

12 Claims, 5 Drawing Sheets

(56) References Cited

U.S. PATENT DOCUMENTS

| | | | |
|---|---|---|---|
| 2002/0181708 A1* | 12/2002 | Seo et al. | 380/252 |
| 2009/0136034 A1* | 5/2009 | Gaal et al. | 380/268 |
| 2009/0190039 A1* | 7/2009 | Yun et al. | 348/724 |
| 2009/0249027 A1* | 10/2009 | Kim et al. | 712/5 |
| 2009/0323957 A1* | 12/2009 | Luo et al. | 380/270 |
| 2011/0176443 A1* | 7/2011 | Astely et al. | 370/252 |
| 2011/0274193 A1* | 11/2011 | Yoon et al. | 375/260 |
| 2012/0297271 A1* | 11/2012 | Sommer et al. | 714/766 |

FOREIGN PATENT DOCUMENTS

| | | |
|---|---|---|
| CN | 101072098 A | 11/2007 |
| CN | 101098162 A | 1/2008 |
| CN | 101098325 A | 1/2008 |

* cited by examiner

US 8,665,925 B2

METHOD AND DEVICE FOR GENERATING SCRAMBLING CODE

CROSS-REFERENCE TO RELATED APPLICATIONS

This application is a 371 U.S. National Stage of International Application No. PCT/CN2010/073970, filed Jun. 13, 2010, and claims priority to Chinese patent application No. 200910165649.8 filed Aug. 12, 2009, the disclosures of which are herein incorporated by reference in their entirety.

TECHNICAL FIELD

The present invention relates to a communication field, particularly, to a method and apparatus for generating a scrambling code.

BACKGROUND OF THE RELATED ART

In the Wideband Code Division Multiple Access (WCDMA) system, in order to realize anti-multipath interference and secrecy, signal is encrypted usually by using a pseudorandom code sequence, namely that the signal is scrambled. In the WCDMA system, the uplink usually uses a Gold code to realize the scrambling of signal, the effect of scrambling the physical channel of the uplink is to distinguish users, and scrambling the downlink can distinguish cells and channels. FIG. 1 is a schematic diagram of a scrambling code generator generating a pseudorandom sequence, in which MSB denotes the most significant bit, and LSB denotes the least significant bit; accordingly, at the base station side of the WCDMA system, the received signal sent by the user needs to be descrambled, and usually uses the Gold code for descrambling.

At the base station side of the WCDMA system, a receiver needs to process multiple users' information, and the scrambling code sequence used by each user and the phase at which the user is while descrambling are different; the simplest method is to design one scrambling code generator for each user, but its defect is that the expense of hardware is large; therefor, a method for time division multiplexing scrambling code is provided in a related art, but the method can only realize producing of one bit scrambling code each time so as to limit ability of processing the users in the case of the fixed system clock. In order to further improve the multiplexing efficiency to process more users in one system, a method for generating 2M-bit scrambling code in one time is provided in another related art, wherein, M=1, 2, 3, . . . , 32, and the method improves the ability of system processing users, but the method has the following defects:

firstly, the range of producing the scrambling code supported by the method is limited, that is, the method only supports producing 2, 4, 6, 8 . . . 64 bits scrambling code, but does not support producing odd bits scrambling code, and has a poor universality;

secondly, the method has a long system delay and low processing efficiency, for example, while producing 64 bits scrambling code, because the method can only produce 16 bits new scrambling code in one rotation, it needs to rotate four times to produce 64 bits scrambling code, thus processing one user will take 4-clock time, resulting in the long system delay and low processing efficiency.

SUMMARY OF THE INVENTION

The technical problem to be solved in the present invention is to provide a method and an apparatus for generating a scrambling code, so as to solve problems, such as poor universality, long system delay, low processing efficiency and the like, occurring while generating the scrambling code in the related art.

In order to solve the above problems, the present invention provides a method for generating a scrambling code, comprising:

acquiring initial sequences X0, Y0;

extending the initial sequences X0, Y0 for ($\lfloor N/M \rfloor$+1) times, and obtaining extended sequences X*, Y*, wherein, the N is a positive integer, $0 < M \leq 22$, and "$\lfloor \ \rfloor$" denotes rounded down;

acquiring phase offset column vectors; and generating the scrambling code according to the extended sequences X*, Y* and the phase offset column vectors.

In order to solve the above problems, the present invention also provides an apparatus for generating a scrambling code, comprising:

a first acquiring module, which is configured to acquire initial sequences X0, Y0;

an extension module, which is configured to extend the initial sequences X0, Y0 acquired by the first acquiring module for ($\lfloor N/M \rfloor$+1) times, and obtain extended sequences X*, Y*; wherein, the N is a positive integer, $0 < M \leq 22$, and "$\lfloor \ \rfloor$" denotes rounded down;

a second acquiring module, which is configured to acquire phase offset column vectors; and a generation module, which is configured to generate the scrambling code according to the sequences X*, Y* extended by the extension module and the phase offset column vectors acquired by the second acquiring module.

In the present invention, by acquiring the initial sequences X0, Y0; extending the initial sequences X0, Y0 for ($\lfloor N/M \rfloor$+1) times, and obtaining the extended sequences X*, Y*, wherein, the N is the positive integer, $0 < M \leq 22$, and "$\lfloor \ \rfloor$" denotes rounded down; acquiring the phase offset column vectors; and generating the scrambling code according to the extended sequences X*, Y* and the phase offset column vectors, the present invention can generate the scrambling code with any bit, can have a good universality and realize full-line design of multiple user time division multiplexing, and in the same system clock, can process more users, reduce the processing delay and greatly improve the processing efficiency.

PREFERRED EMBODIMENTS OF THE PRESENT INVENTION

The core idea of the present invention comprises: acquiring the initial sequences X0, Y0; extending the initial sequences X0, Y0 for ($\lfloor N/M \rfloor$+1) times, and obtaining the extended sequences X*, Y*, wherein, the N is a positive integer, 0<M≤22, and "⌊ ⌋" denotes rounded down; acquiring the phase offset column vectors; and generating the scrambling code according to the extended sequences X*, Y* and the phase offset column vectors. The present invention can generate the scrambling code with any bit, have a good universality and realize the full-line design of multiple user time division multiplexing, and in the same system clock, can process more users, reduce the processing delay and greatly improve the processing efficiency.

The technical scheme of the present invention will be illustrated in detail in combination with accompanying drawings and preferred embodiments in the following.

Figure 1:
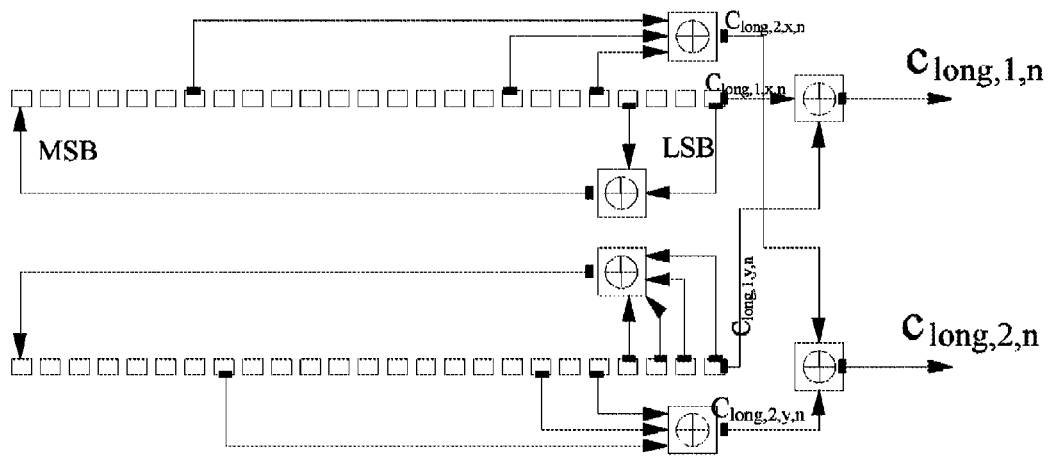
FIG. 1 is a structural schematic diagram of a scrambling code generator in the related art.
Figure 2:
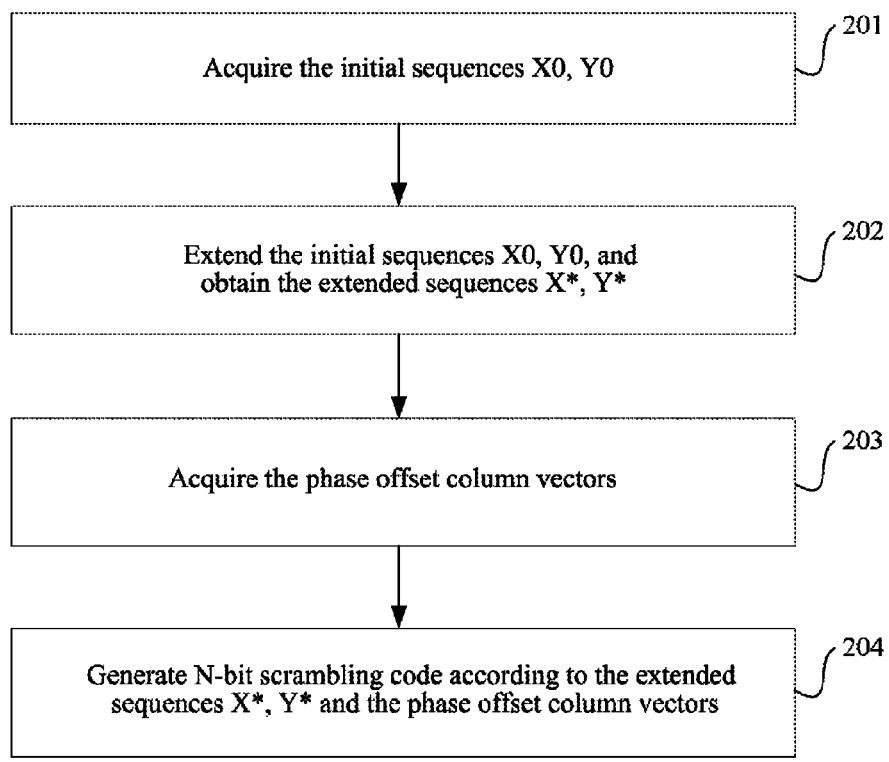
FIG. 2 is a flow chart of a method for generating a scrambling code of an embodiment in the present invention.

An embodiment of the present invention provides a method for generating the scrambling code, and as shown in FIG. 2, the method comprises that:

201, the initial sequences X0, Y0 are acquired.

Figure 3:
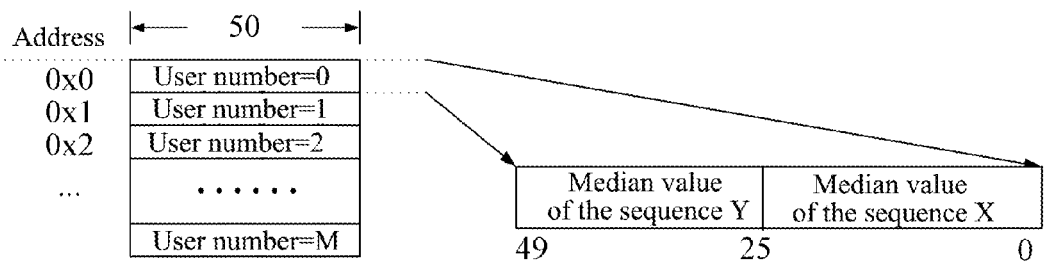
FIG. 3 is a schematic diagram of an association relation between user number and median values of the sequences X, Y of an embodiment in the present invention.

Specifically, firstly, according to the current user number, median values of the sequences X, Y buffered in a storage by the user is read by using an association relation between the user number and the median values of the sequences X, Y, wherein, the association relation between the user number and the median values of the sequences X, Y is shown in FIG. 3, and the median values of the sequences X, Y is the $25^{th}$ bit. According to whether the user in the current processing period producing the scrambling code for the first time, the user selects whether to use the initially configured sequences X, Y or to use the median values of the sequences X, Y buffered in the storage as the initial sequences X0, Y0, if the user produces the scrambling code for the first time, then the user uses the initially configured sequences X, Y as the initial sequences X0, Y0; and if the user does not produce the scrambling code for the first time, then the user uses the median values of the sequences X, Y read from the storage as the initial sequences X0, Y0.

202, the initial sequences X0, Y0 are extended for ($\lfloor N/M \rfloor$+1) times to obtain the extended sequences X*, Y*, and its high 25-bit sequence X~, Y~ is sent back to the storage for buffering so as to act as the initial sequences X0, Y0 for continuously producing the scrambling code next time, wherein, "⌊ ⌋" denotes rounded down, the N is the positive integer, 0<M≤22, and preferably, the value range of N is greater than 0 and less than 2560.

Make $\lfloor N/M \rfloor$+1 be j, 0<q≤j;

the $0^{th}$ bit to the $(24+M\times(q-1))^{th}$ bit of the sequence Xq after extension for the $q^{th}$ time is the same as the $0^{th}$ bit to the $(24+M\times(q-1))^{th}$ bit of the sequence X(q−1) after extension for the $(q-1)^{th}$ time, and the $(25+M\times(q-1)+k)^{th}$ bit of the sequence Xq is a result by adding the module 2 of the $(M\times(q-1)+k)^{th}$ bit and the $(M\times(q-1)+k+3)^{th}$ bit of the sequence X(q−1); and the sequence Yq after extension for the $q^{th}$ time is the same as the $0^{th}$ bit to the $(24+M\times(q-1))^{th}$ bit of the sequence Y(q−1) after extension for the $(q-1)^{th}$ time, and the $(25+M\times(q-1)+k)^{th}$ bit of the sequence Yq is a result by adding the module 2 of the $(M\times(q-1)+k)^{th}$ bit, the $(M\times(q-1)+k+1)^{th}$ bit, the $(M\times(q-1)+k+2)^{th}$ bit and the $(M\times(q-1)+k+3)^{th}$ bit of the sequence Y(q−1); wherein, 0≤k≤21.

Figure 4:
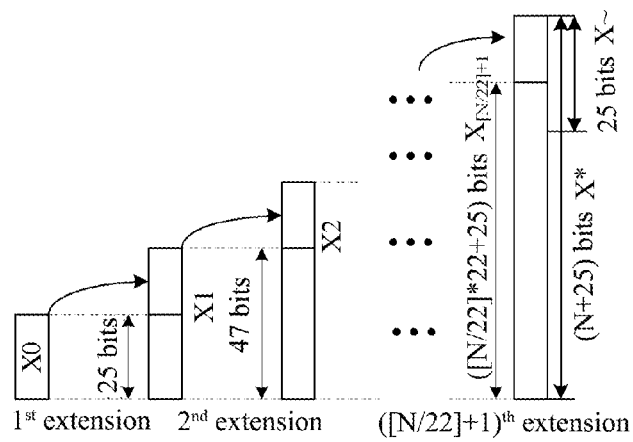
FIG. 4 is a schematic diagram of extending the initial sequences X0, Y0 of an embodiment in the present invention.

To describe simply and conveniently, the present embodiment takes the value of M being 22 for example to illustrate. Specifically, the initial sequences X0, Y0 obtained from step 201 are respectively extended as the sequences X*, Y* with N+25 bits. Because of extending 22 bits once, ($\lfloor N/22 \rfloor$+1) times' extension is needed if extending from 25 bits to N+25 bits, and the schematic diagram of extending is shown in FIG. 4, specifically, the $0^{th}$ bit to the $24^{th}$ bit of the sequence X1 after the $1^{st}$ time's extension is the same as the $0^{th}$ bit to the $24^{th}$ bit of the initial sequence X0, the $25^{th}$ bit of the sequence X1 is a result by adding module 2 of the $0^{th}$ bit and the $3^{rd}$ bit of the initial sequence X0, the $26^{th}$ bit is a result by adding module 2 of the $1^{st}$ bit and the $4^{th}$ bit of the initial sequence X0, the $27^{th}$ bit is a result by adding module 2 of the $2^{nd}$ bit and the $5^{th}$ bit of the initial sequence X0, and the like, the $46^{th}$ bit is a result by adding module 2 of the $21^{st}$ bit and the $24^{th}$ bit of the initial sequence X0, thus obtaining the sequence X1 with 47 bits. The $0^{th}$ bit to the $46^{th}$ bit of the sequence X2 after the $2^{nd}$ time' extension is the same as the $0^{th}$ bit to the $46^{th}$ bit of the sequence X1, the $47^{th}$ bit of the sequence X2 is a result by adding module 2 of the $22^{nd}$ bit and the $25^{th}$ bit of the sequence X1, the $48^{th}$ bit is a result by adding module 2 of the $23^{rd}$ bit and the $26^{th}$ bit of the sequence X1, and the like, the $68^{th}$ bit is a result by adding module 2 of the $43^{rd}$ bit and the $46^{th}$ bit of the sequence X1, thus obtaining the sequence X2 with 69 bits. The $0^{th}$ bit to the $68^{th}$ bit of the sequence X3 after the $3^{rd}$ time' extension is the same as the $0^{th}$ bit to the $68^{th}$ bit of the sequence X2, the $69^{th}$ bit of the sequence X3 is a result by adding module 2 of the $44^{th}$ bit and the $47^{th}$ bit of the sequence X2, the $70^{th}$ bit is a result by adding module 2 of the $45^{th}$ bit and the $48^{th}$ bit of the sequence X2, and the like, the $88^{th}$ bit is a result by adding module 2 of the $63^{rd}$ bit and the $66^{th}$ bit of the sequence X2, thus obtaining the sequence X3 with 89 bits . . . , and the like, until obtaining the sequence X* with N+25 bits.

The sequence Y0 will be extended by using the similar principle, the $0^{th}$ bit to the $24^{th}$ bit of the sequence Y1 after the $1^{st}$ time's extension is the same as the $0^{th}$ bit to the $24^{th}$ bit of the initial sequence Y0; but the extension is different from that of sequence X0, the $25^{th}$ bit of the sequence Y1 is a result by adding module 2 of the $0^{th}$, $1^{st}$, $2^{nd}$ and $3^{rd}$ bits of the sequence Y0, the $26^{th}$ bit is a result by adding module 2 of the $1^{st}$, $2^{nd}$, $3^{rd}$, and $4^{th}$ bits of the sequence $27^{th}$ bit is a result by adding module 2 of the $2^{nd}$, $3^{rd}$, $4^{th}$, and $5^{th}$ bits of the sequence Y0, . . . , and the like, until obtain the sequence Y* with N+25 bits.

203, the phase offset column vectors are acquired.

Figure 5:
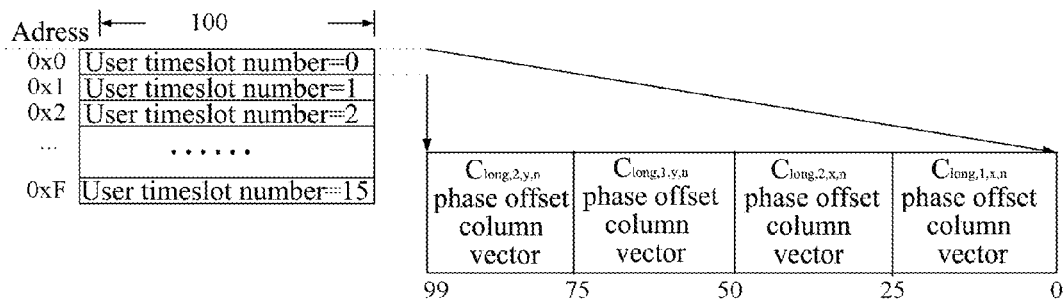
FIG. 5 is a schematic diagram of an association relation between user time slot number and phase offset column vectors of an embodiment in the present invention.

In the WCDMA system, data will be processed at the beginning of a timeslot head, thus the system only starts to produce the scrambling code from a certain timeslot head, only stores the phase offset column vectors of each timeslot head, and only needs to store 15 groups of the association relation of the user timeslot number and the phase offset column vectors because one frame of the WCDMA system has 15 timeslots at most, as shown in FIG. 5, therefore, the phase offset column vectors can be read from the storage by using the association relation between the user timeslot number and the phase offset column vectors according to the configured user timeslot number. Wherein, the generation of $C_{long,1,x,n}$, $C_{long,2,x,n}$, $C_{long,1,y,n}$ and $C_{long,2,y,n}$ phase offset column vectors can use the following method:

203a, phase offset matrixes XT and YT are acquired:

for the sequence X0, it can be known from the generator polynomial of the sequence X0 that, the $0^{th}$ bit to the $23^{rd}$ bit of the sequence X1 obtained after offsetting one phase is the $1^{st}$ bit to $24^{th}$ bit of the sequence X0, the $24^{th}$ bit of the sequence X1 is a result by adding module 2 of the $0^{th}$ bit and the $3^{rd}$ bit of the sequence X0, and at this moment, the $23^{rd}$ row in the $24^{th}$ column parameters of the phase offset matrix XT is 1 and the other rows are 0, the $22^{nd}$ row in the $23^{rd}$ column parameters is 1 and the other rows are 0, . . . , the $0^{th}$ row in the $1^{st}$ column parameters is 1 and the other rows are 0, and the $24^{th}$ and $21^{st}$ row in the $0^{th}$ column parameters are 1 and the other rows are 0; for the sequence Y0, it can be known from the generator polynomial of the sequence Y0 that, the $0^{th}$ bit to the $23^{rd}$ bit of the sequence Y1 obtained after offsetting one phase is the $1^{st}$ bit to $24^{th}$ bit of the sequence Y0, the $24^{th}$ bit of the sequence Y1 is a result by adding module 2 of the $0^{th}$, $1^{st}$, $2^{nd}$ and $3^{rd}$ bits of the sequence Y0, and at this moment, the $23^{rd}$ row in the $24^{th}$ column parameters of the phase offset matrix YT is 1 and the other rows are 0, the $22^{nd}$ row in the $23^{rd}$ column parameters is 1 and the other rows are 0, . . . , the $0^{th}$ row in the $1^{st}$ column parameters is 1 and the other rows are 0, and the $24^{th}$, $23^{rd}$, $22^{nd}$ and $21^{st}$ row in the $0^{th}$ column parameters is 1 and the other rows are 0. The phase offset matrixes XT and YT can be shown respectively in the following table 1 and table 2:

TABLE 1

$$XT = \begin{bmatrix}
0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 \\
1 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 \\
1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

TABLE 2

$$YT = \begin{bmatrix}
0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 & 0 \\
1 & 0 & 0 & 0 & 0 & 0 & 0 & 0 & 0 & 0 & 0 & 0 & 0 & 0 & 0 & 0 & 0 & 0 & 0 & 0 & 0 & 1 & 0 & 0 \\
1 & 0 & 0 & 0 & 0 & 0 & 0 & 0 & 0 & 0 & 0 & 0 & 0 & 0 & 0 & 0 & 0 & 0 & 0 & 0 & 0 & 0 & 1 & 0 \\
1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 1 \\
1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

203b, the phase offset matrixes of the sequences X0, Y0 are determined according to the phase offset of the scrambling code and the phase offset matrixes XT, YT.

If the phase offset is 1, then the method of calculating the phase offset matrix $XT_1$ is: multiplying the corresponding element of the vector $(A_p)$ in the $p^{th}$ row of the XT by the corresponding element of the vector $(B_r)$ in the $r^{th}$ column of the XT, then adding the module 2, and thus the value is the element $(a_{rp})$ of the $p^{th}$ row, the $r^{th}$ column of the phase offset matrix $XT_1$. Namely, $a_{rp}=\hat{}(A_p \& B_r)$; wherein, $0 \le r < 25$, $0 \le p < 25$.

If the phase offset is 2, then the method of calculating the phase offset matrix $XT_2$ is: multiplying the corresponding element of the vector $(A_p)$ in the $p^{th}$ row of the $XT_1$ by the corresponding element of the vector $(B_r)$ in the $r^{th}$ column of the XT, then adding the module 2, and thus the value is the element $(a_{rp})$ of the $p^{th}$ row, the $r^{th}$ column of the phase offset matrix $XT_2$. Namely, $a_{rp}=\hat{}(A_p \& B_r)$; wherein, $0 \le r < 25$, $0 \le p < 25$.

If the phase offset is 3, then the method of calculating the phase offset matrix $XT_3$ is: multiplying the corresponding element of the vector $(A_p)$ in the $p^{th}$ row of the $XT_2$ by the corresponding element of the vector $(B_r)$ in the $r^{th}$ column of the XT, then adding the module 2, and thus the value is the element $(a_{rp})$ of the $p^{th}$ row, the $r^{th}$ column of the phase offset matrix $XT_3$. Namely, $a_{rp}=\hat{}(A_p \& B_r)$; wherein, $0 \le r < 25$, $0 \le p < 25$.

And the like, if the phase offset is t, then the method of calculating the phase offset matrix $XT_t$ is: multiplying the corresponding element of the vector $(A_p)$ in the $p^{th}$ row of the $XT_{(t-1)}$ by the corresponding element of the vector $(B_r)$ in the $r^{th}$ column of the XT, then adding the module 2, and thus the value is the element $(a_{rp})$ of the $p^{th}$ row, the $r^{th}$ column of the phase offset matrix $XT_t$. Namely, $a_{rp}=\hat{}(A_p \& B_r)$; wherein, $0 \le r < 25$, $0 \le p < 25$.

Similarly, if the phase offset is t, then the method of calculating the phase offset matrix $YT_t$ is: multiplying the corresponding element of the vector $(A_p)$ in the $p^{th}$ row of the $YT_{(t-1)}$ by the corresponding element of the vector $(B_r)$ in the $r^{th}$ column of the YT, then adding the module 2, and thus the value is the element $(a_{rp})$ of the $p^{th}$ row, the $r^{th}$ column of the phase offset matrix $YT_t$. Namely, $a_{rp}=\hat{}(A_p \& B_r)$; wherein, $0 \le r < 25$, $0 \le p < 25$.

According to the above scheme, the phase offset matrixes $XT_t$, $YT_t$ of the sequences X0, Y0 can be figured out when the offset is t ($0 \le t < 38400$).

203c, $C_{long,1,x,n}$, $C_{long,2,x,n}$ generation vectors and $C_{long,1,y,n}$, $C_{long,2,y,n}$ generation vectors are determined.

$C_{long,1,x,n}$ is the $0^{th}$ bit of the sequence X0, so the $C_{long,1,x,n}$ generation vector is [0,0,0,0,0,0,0,0,0,0,0,0,0,0,0,0,0,0,0,0,0,0,0,0,1]T, $C_{long,2,x,n}$ is obtained by adding the module 2 of the $4^{th}$, $7^{th}$ and $18^{th}$ bits of the sequence X, so the $C_{long,2,x,n}$ generation vector is [0,0,0,0,0,0,1,0,0,0,0,0,0,0,0,0,0,1,0,0,1, 0,0,0,0]T, the $C_{long,1,y,n}$ is the $0^{th}$ bit of the sequence Y0, so the $C_{long,1,y,n}$ generation vector is [0,0,0,0,0,0,0,0,0,0,0,0,0,0,0, 0,0,0,0,0,0,0,0,0,1]T, and $C_{long,2,y,n}$ is obtained by adding the module 2 of the $4^{th}$, $6^{th}$ and $17^{th}$ bits of the sequence Y, so the $C_{long,2,y,n}$ generation vector is [0,0,0,0,0,0,1,0,0,0,0,0,0, 0,0,0,1,0,1,0,0,0,0]T.

203d, the $C_{long,1,x,n}$, $C_{long,2,x,n}$, $C_{long,1,y,n}$, $C_{long,2,y,n}$ phase offset column vectors are obtained according to the phase offset matrixes of the sequences X0, Y0 and the $C_{long,1,x,n}$, $C_{long,2,x,n}$ generation vectors and $C_{long,1,y,n}$, $C_{long,2,y,n}$ generation vectors.

Specifically, the method of calculating the $C_{Long,1,x,n}$ phase offset column vector whose phase offset is t is: multiplying the corresponding element of the vector $(A_p)$ in the $p^{th}$ row of the $XT_t$ by the corresponding element of the $C_{long,1,x,n}$ generation vector (C1X), then adding the module 2, and thus the value is the $p^{th}$ element $(a_p)$ of the $C_{long,1,x,n}$ phase offset column vector whose phase offset is t. Namely, $a_p=\hat{}(A_p \& C1X)$; wherein, $0 \le p < 25$.

The method of calculating the $C_{long,2,x,n}$ phase offset column vector whose phase offset is t is: multiplying the corresponding element of the vector $(A_p)$ in the $p^{th}$ row of the $XT_t$ by the corresponding element of the $C_{long,2,x,n}$ generation vector (C2X), then adding the module 2, and thus the value is the $p^{th}$ element $(a_p)$ of the $C_{long,2,x,n}$ phase offset column vector whose phase offset is t. Namely, $a_p=\hat{}(A_p \& C2X)$; wherein, $0 \le p < 25$.

The method of calculating the $C_{long,1,y,n}$ phase offset column vector whose phase offset is t is: multiplying the corresponding element of the vector $(A_p)$ in the $p^{th}$ row of the $YT_t$ by the corresponding element of the $C_{long,1,y,n}$ generation vector (C1Y), then adding the module 2, and thus the value is the $p^{th}$ element $(a_p)$ of the $C_{long,1,y,n}$ phase offset column vector whose phase offset is t. Namely, $a_p=\hat{}(A_p \& C1Y)$; wherein, $0 \le p < 25$.

The method of calculating the $C_{long,2,y,n}$ phase offset column vector whose phase offset is t is: multiplying the corresponding element of the vector $(A_p)$ in the $p^{th}$ row of the $YT_t$ by the corresponding element of the $C_{long,2,y,n}$ generation vector (C2Y), then adding the module 2, and thus the value is the $p^{th}$ element $(a_p)$ of the $C_{long,2,y,n}$ phase offset column vector whose phase offset is t. Namely, $a_p=\hat{}(A_p \& C2Y)$; wherein, $0 \le p < 25$.

The t is the phase offset, which can be any integral value within the range of 0-38400.

In the WCDMA system, each radio frame comprises 38400 code chip data and is divided into 15 timeslots, and each timeslot comprises 2560 code chip data. The system generally start to perform the descrambling from a certain timeslot head of the 15 timeslots, that is, the phase offset of the scrambling code generally is $2560 \times n$, wherein, n=0, 1, 2, ..., 13, 14; to simplify the design, the above method can be used for pre-calculating and obtaining the $C_{long,1,x,n}$, $C_{long,2,x,n}$, $C_{long,1,y,n}$, $C_{long,2,y,n}$ phase offset column vectors whose phase offsets are $2560 \times n$, the number of which is 60 column vectors in total, and they will be stored in a very low-capacity storage.

204, N-bit scrambling code is generated according to the extended sequences X*, Y* and the phase offset column vectors obtained in step 203.

The extended sequences X*, Y* actually is the superposition of N phase offset continuous scrambling codes, that is to say, in the sequence X* with N+25 bits, the $0^{th} \sim 24^{th}$ bits are the sequence X0 before extension, the $1^{st} \sim 25^{th}$ bits are a result after the sequence X0 offsets 1 phase, the $2^{nd} \sim 26^{th}$ bits are a result after the sequence X0 offsets 2 phases, ..., and the like, the $N^{th} \sim (N+24)^{th}$ bits are a result after the sequence X0 offsets N phases; and similarly, the bits in the sequence Y* with N+25 bits are also the superposition of N phase offset continuous scrambling codes.

It can be known from the analysis in step 203 that, the $C_{long,1,x,n}$ can be obtained by multiplying the sequence X0 the $C_{long,1,x,n}$ generation vector; the $C_{long,1,x,n}$ after offsetting one phase can be obtained by multiplying the sequence X0 after offsetting one phase by the $C_{long,1,x,n}$ phase offset column vector, the $C_{long,1,x,n}$ after offsetting two phases can be obtained by multiplying the sequence X0 after offsetting two phases by the $C_{long,1,x,n}$ phase offset column vector, ..., and the like, N phase offset continuous $C_{long,1,x,n}$ can be obtained by multiplying the sequence X0 after offsetting N phases by the $C_{long,1,x,n}$ phase offset column vector, wherefrom, a formula, $C_{long,1,x,n}[i]=\hat{}(X^*[i+24: i] \& C_{long,1,x,n}$ phase offset column vector), can be obtained wherein $0 \leq i < N$, so that N phase offset continuous $C_{long,1,x,n}$ can be obtained. Similarly, according to a formula $C_{long,2,x,n}[i]=\hat{}(X^*[i+24: i] \& C_{long,2,x,n}$ phase offset column vector), N phase offset continuous $C_{long,2,x,n}$ can be obtained. Similarly, according to a formula $C_{long,1,y,n}[i]=\hat{}(Y^*[i+24: i] \& C_{long,1,y,n}$ phase offset column vector), N phase offset continuous $C_{long,1,y,n}$ can be obtained. Similarly, according to a formula $C_{long,2,y,n}[i]=\hat{}(Y^*[i+24: i] \& C_{long,2,y,n}$ phase offset column vector), N phase offset continuous $C_{long,2,y,n}$ can be obtained.

Wherein, $X^*[i+24: i]$ denotes the $i^{th}$ bit to the $(i+24)^{th}$ bit of the $X^*$ sequence, and $Y^*[i+24: i]$ denotes the $i^{th}$ bit to the $(i+24)^{th}$ bit of the $Y^*$ sequence, where, $0 \leq i < N$.

Figure 6:
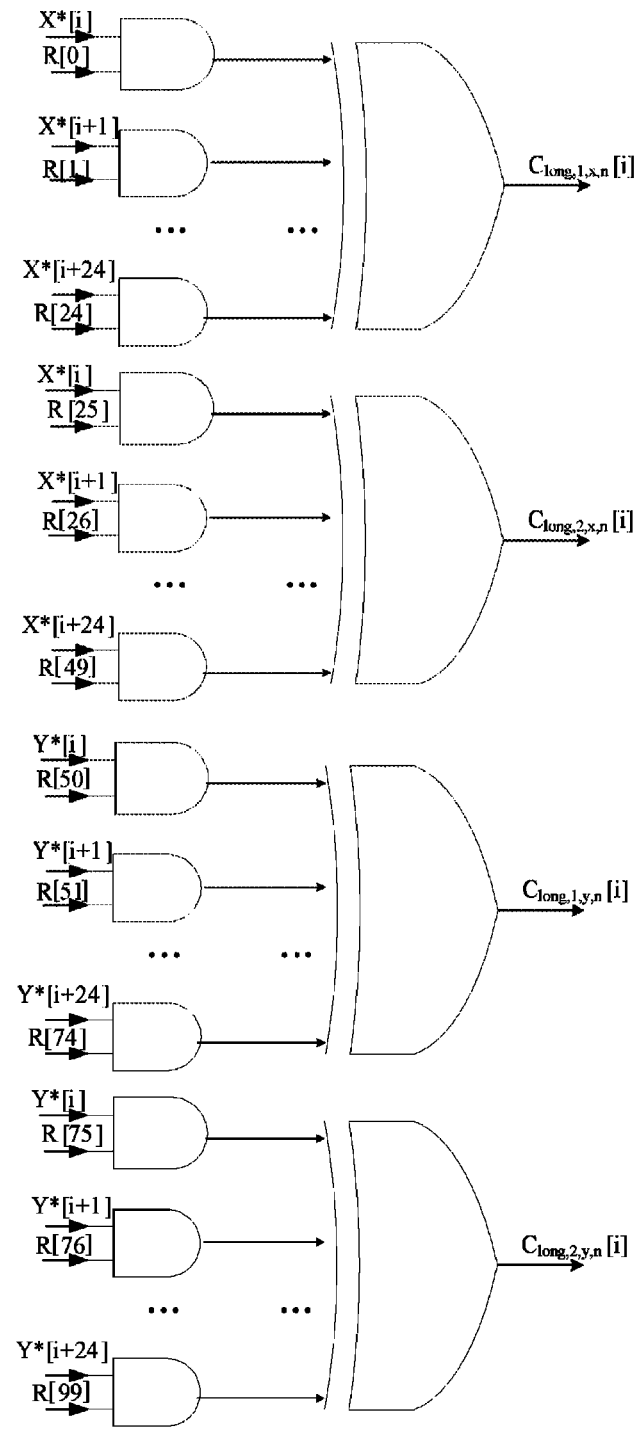
FIG. 6 is a circuit diagram of generating N phase offset continuous $C_{long,1,x,n}$, $C_{long,2,x,n}$, $C_{long,1,y,n}$ and $C_{long,2,y,n}$ of an embodiment in the present invention.

Wherein, the circuit diagram of generating N phase offset continuous $C_{long,1,x,n}$, $C_{long,2,x,n}$, $C_{long,1,y,n}$ and $C_{long,2,y,n}$ is shown in FIG. 6, in which, R[0], R[1], . . . , R[24] are the $C_{long,1,x,n}$ phase offset column vectors, R[25], R[26], . . . , R[49] are the $C_{long,2,x,n}$ phase offset column vectors, R[50], R[51], . . . , R[74] are the $C_{long,1,y,n}$ phase offset column vectors, R[75], R[76], . . . , R[99] are the $C_{long,2,y,n}$ phase offset column vectors.

Wherein, the generated scrambling code is composed of the $C_{long,1,n}$ and the $C_{long,1,n}$, and the $C_{long,1,n}$ is obtained by adding the module 2 of the $C_{long,1,x,n}$ and the $C_{long,1,y,n}$ and the $C_{long,2,n}$ is obtained by adding the module 2 of the $C_{long,2,x,n}$ and the $C_{long,2,y,n}$, so that there is:

the real part of the generated scrambling code $C_{long,n}$ being: $Re[C_{long,n}[i]]=C_{long,1,x,n}[i]\hat{}C_{long,1,y,n}[i]$;

the imaginary part of the generated scrambling code $C_{long,n}$ being: $Im[C_{long,n}[i]]=(-1)^i \times C_{long,1,x,n}[i] \quad \hat{}C_{long,1,y,n}[i]\hat{}C_{long,2,x,n}[(2\lfloor i/2 \rfloor)]\hat{}C_{long,2,y,n}[(2\lfloor i/2 \rfloor)]$, wherein, $0 \leq i < N$.

Figure 7:
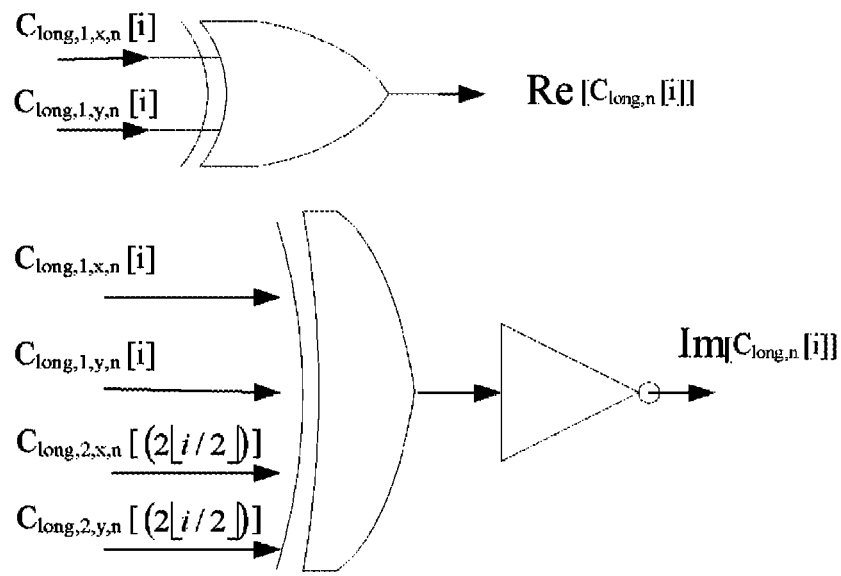
FIG. 7 is a circuit diagram of generating N-bit scrambling code of an embodiment in the present invention.
Figure 8:
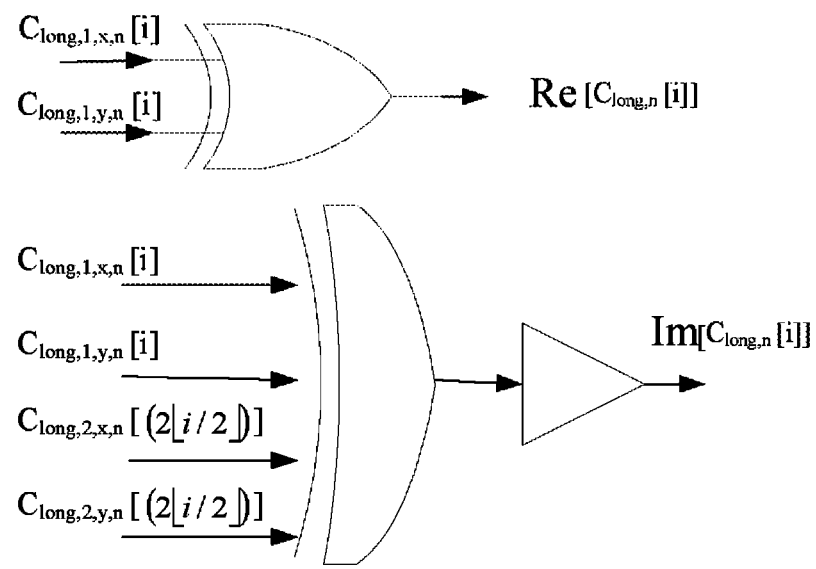
FIG. 8 is another circuit diagram of generating N-bit scrambling code of an embodiment in the present invention.

Wherefrom, N phase offset continuous scrambling codes can be obtained. When i is an odd number, the specific circuit diagram is shown in FIG. 7, and when i is an even number, the specific circuit diagram is shown in FIG. 8.

Figure 9:
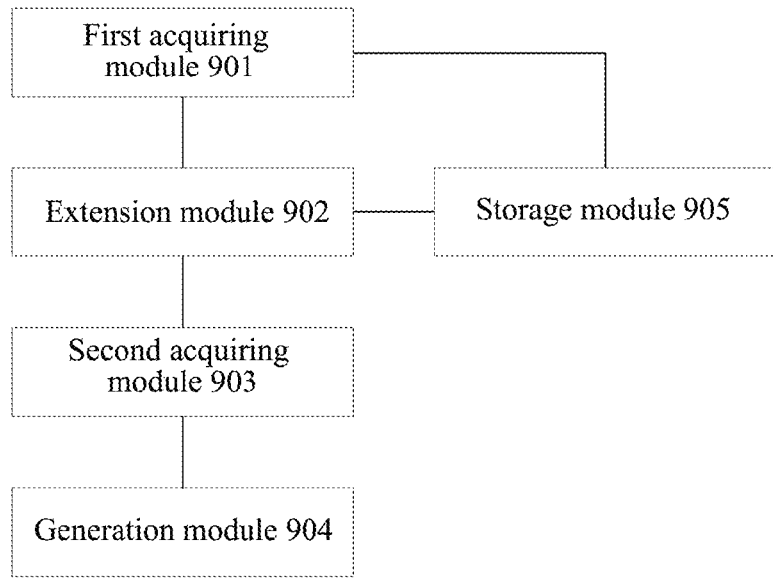
FIG. 9 is a structural schematic diagram of an apparatus for generating a scrambling code of an embodiment in the present invention.

Based on the same inventive concept with the method embodiment, the present invention provides an apparatus for generating the scrambling code, and as shown in FIG. 9, the apparatus comprises:

a first acquiring module 901, which is configured to acquire the initial sequences X0, Y0;

an extension module 902, which is configured to extend the initial sequences X0, Y0 acquired by the first acquiring module 901 for ($\lfloor N/M \rfloor +1$) times, and obtain the extended sequences $X^*$, $Y^*$, wherein, the N is a positive integer, $0 < M \leq 22$, and "$\lfloor \ \rfloor$" denotes rounded down;

a second acquiring module 903, which is configured to acquire the phase offset column vectors; and a generation module 904, which is configured to generate the scrambling code according to the sequences $X^*$, $Y^*$ extended by the extension module 902 and the phase offset column vectors acquired by the second acquiring module 903.

Specifically, the first acquiring module 901 is configured to: according to the current user number, read the median values of the sequences X, Y of the user by using the association relation between the user number and the median values of the sequences X, Y; judge whether the user in the current processing period produces the scrambling code for the first time, if yes, then select the initially configured sequences X, Y as the initial sequences X0, Y0; and if not, then select the read median values of the sequences X, Y as the initial sequences X0, Y0.

The extension module 902 is configured to: make $\lfloor N/M \rfloor +1$ be j, $0 < q \leq j$; the $0^{th}$ bit to the $(24+M \times (q-1))^{th}$ bit of the sequence Xq after the $q^{th}$ time' extension is the same as the $0^{th}$ bit to the $(24+M \times (q-1))^{th}$ bit of the sequence $X(q-1)$ after the $(q-1)^{th}$ time' extension, the $(25+M \times (q-1)+k)^{th}$ bit of the sequence Xq is a result by adding model 2 of the $(M \times (q-1)+k)^{th}$ bit and the $(M \times (q-1)+k+3)^{th}$ bit of the sequence $X(q-1)$; and the sequence Yq after the $q^{th}$ time' extension is the same as the $0^{th}$ bit to the $(24+M \times (q-1))^{th}$ bit of the sequence $Y(q-1)$ after the $(q-1)^{th}$ time' extension, the $(25+M \times (q-1)+k)^{th}$ bit of the sequence Yq is a result by adding model 2 of the $(M \times (q-1)+k)^{th}$ bit, the $(M \times (q-1)+k+1)^{th}$ bit, the $(M \times (q-1)+k+2)^{th}$ bit and the $(M \times (q-1)+k+3)^{th}$ bit of the sequence $Y(q-1)$; wherein, $0 \leq k \leq 21$.

Furthermore, the apparatus further comprises:

a storage module 905, which is configured to store the $(N+1)^{th}$ bit to the $(N+25)^{th}$ bit of the extended sequence $X^*$, $Y^*$.

Figure 10:
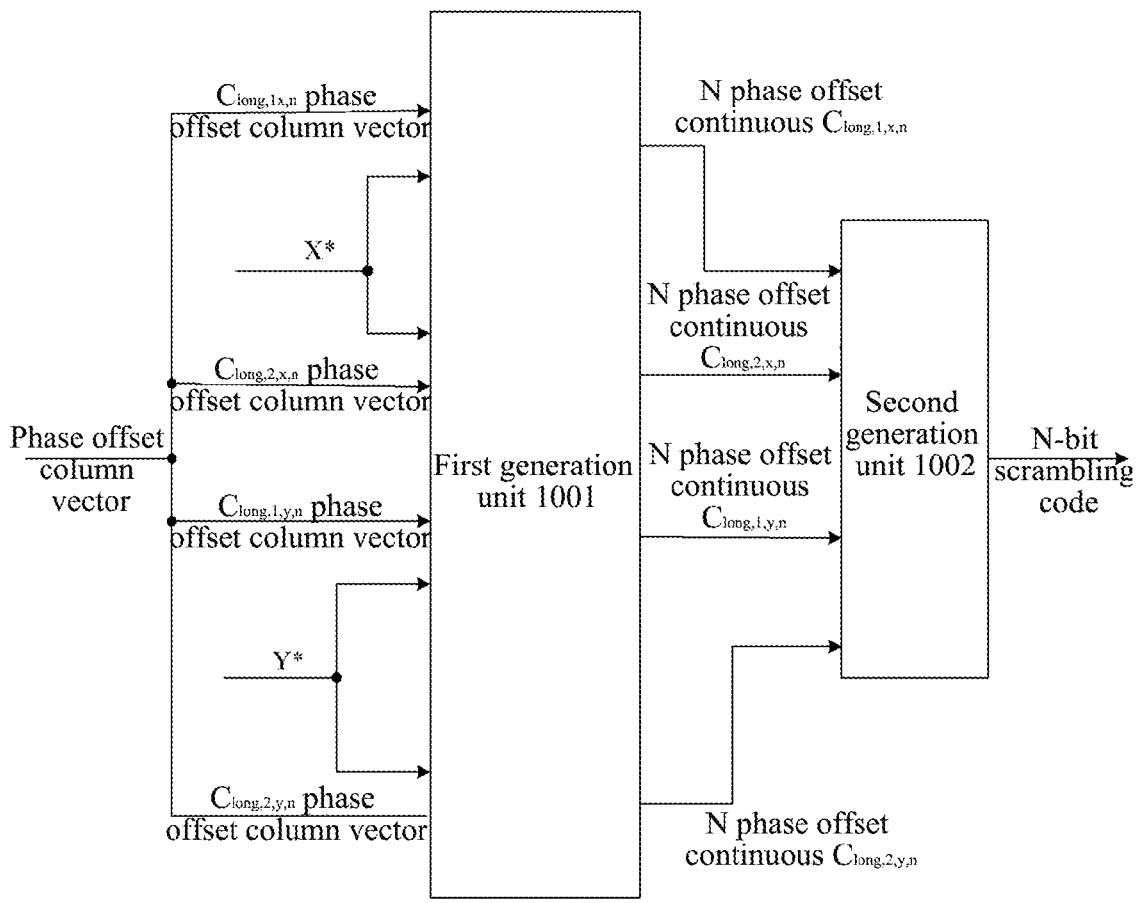
FIG. 10 is a structural schematic diagram of a generation module of an embodiment in the present invention.

Furthermore, as shown in FIG. 10, the generation module 904 comprises:

a first generation unit 1001, which is configured to: according to a formula $C_{long,1,x,n}[i]=\hat{}(X^*[i+24: i] \& C_{long,1,x,n}$ phase offset column vector), obtain N phase offset continuous $C_{long,1,x,n}$; according to a formula $C_{long,1,x,n}[i]=\hat{}(X^*[i+24: i] \& C_{long,2,x,n}$ phase offset column vector), obtain N phase offset continuous $C_{long,2,x,n}$; according to a formula $C_{long,1,y,n}[i]=\hat{}(Y^*[i+24: i] \& C_{long,1,y,n}$ phase offset column vector), obtain N phase offset continuous $C_{long,1,y,n}$; and according to a formula $C_{long,2,y,n}[i]=\hat{}(Y^*[i+24: i] \& C_{long,1,y,n}$ phase offset column vector), obtain N phase offset continuous $C_{long,1,y,n}$;

a second generation unit 1002, which is configured to generate the scrambling code $C_{long,n}$; wherein, the real part of the scrambling code $C_{long,n}$ is: $Re[C_{long,n}[i]]=C_{long,1,x,n}[i]\hat{}C_{long,1,y,n}[i]$, and the imaginary part is: $Im[C_{long,n}[i]]=(-1)^i \times C_{long,1,x,n}[i]\hat{}C_{long,2,x,n}[(2\lfloor i/2 \rfloor)]\hat{}C_{long,2,y,n}[(2\lfloor i/2 \rfloor)]$, wherein, $0 \leq i < N$.

Wherein, the circuit diagram of the first generation unit 1001 can be shown in FIG. 6, in which, R[0], R[1], . . . , R[24] are the $C_{long,1,x,n}$ phase offset column vectors, R[25], R[26], . . . , R[49] are the $C_{long,2,x,n}$ phase offset column vectors, R[50], R[51], . . . , R[74] are the $C_{long,1,y,n}$ phase offset column vectors, and R[75], R[76], . . . , R[99] are the $C_{long,2,y,n}$ phase offset column vectors. When i is an odd number, the circuit diagram of the second generation unit is shown in FIG. 7, when i is an even number, the circuit diagram of the second generation unit is shown in FIG. 8.

In the embodiments of the present invention, by acquiring the initial sequences X0, Y0; extending the initial sequences X0, Y0 for ($\lfloor N/M \rfloor +1$) times, and obtaining the extended sequences $X^*$, $Y^*$, wherein, the N is a positive integer, $0 < M \leq 22$ and "$\lfloor \ \rfloor$" denotes rounded down; acquiring the phase offset column vectors; and generating the scrambling code according to the extended sequences $X^*$, $Y^*$ and the phase offset column vectors, the scrambling code with any bit can be generated, there is a good universality and full-line design of multiple user time division multiplexing can be realized; in the same system clock, more users can be processed, the processing delay is reduced and the processing efficiency is greatly improved. Furthermore, the present invention can further realize that the scrambling code rotates rapidly to any timeslot, the rotation matrix does not need to be stored, but directly storing the phase offset column vectors, thereby not only decreasing the storage space, but also greatly mitigating the calculated amount in the process of producing the scrambling code, and simplifying the circuit structure and reducing the consumption of resource.

It should be understood that the above detailed description for the specific embodiments cannot be regarded as the limitation to the scope of patent protection of the present invention, and the scope of patent protection of the present invention should conform to the appending claims.

INDUSTRIAL APPLICABILITY

The method and apparatus for generating the scrambling code provided by the present invention can generate the scrambling code with any bit, has a good universality and can realize full-line design of the multiple user time division multiplexing, and in the same system clock, can process more users, reduce the processing delay and greatly improve the processing efficiency.

We claim:

1. A method for generating a scrambling code, comprising:
  acquiring initial sequences X0, Y0;
  extending the initial sequences X0, Y0 for ($\lfloor N/M \rfloor+1$) times, and obtaining extended sequences X*, Y*, wherein, the N is a positive integer, $0<M\leq 22$, and "$\lfloor\ \rfloor$" denotes rounded down;
  acquiring phase offset column vectors; and
  generating the scrambling code according to the extended sequences X*, Y* and the phase offset column vectors;
  wherein, the step of acquiring the initial sequences X0, Y0 comprises:
  according to the current user number, reading median values of sequences X, Y of a user by using an association relation between the user number and the median values of the sequences X, Y;
  judging whether the user in the current processing period produces the scrambling code for the first time, if yes, selecting the initial configured sequences X, Y as the initial sequences X0, Y0; and
  if not, selecting the read median values of the sequences X, Y as the initial sequences X0, Y0.

2. The method according to claim 1, wherein, the step of extending the initial sequences X0, Y0 for ($\lfloor N/M \rfloor+1$) times, and obtaining the extended sequences X*, Y* comprises:
  making $\lfloor N/M \rfloor+1$ be j, $0<q\leq j$; and
  extending the initial sequences X0, Y0 for j times, so that the $0^{th}$ bit to the $(24+M\times(q-1))^{th}$ bit of a sequence Xq after the $q^{th}$ time' extension is the same as the $0^{th}$ bit to the $(24+M\times(q-1))^{th}$ bit of a sequence X(q-1) after the $(q-1)^{th}$ time' extension, the $(25+M\times(q-1)+k)^{th}$ bit of the sequence Xq is a result by adding model 2 of the $(M\times(q-1)+k)^{th}$ bit and the $(M\times(q-1)+k+3)^{th}$ bit of the sequence X(q-1); and a sequence Yq after the $q^{th}$ time' extension is the same as the $0^{th}$ bit to the $(24+M\times(q-1))^{th}$ bit of a sequence Y(q-1) after the $(q-1)^{th}$ time' extension, the $(25+M\times(q-1)+k)^{th}$ bit of the sequence Yq is a result by adding model 2 of the $(M\times(q-1)+k)^{th}$ bit, the $(M\times(q-1)+k+1)^{th}$ bit, the $(M\times(q-1)+k+2)^{th}$ bit and the $(M\times(q-1)+k+3)^{th}$ bit of the sequence Y(q-1); wherein, $0\leq k\leq 21$.

3. The method according to claim 1, wherein, after the step of extending the initial sequences X0, Y0 for ($\lfloor N/M \rfloor+1$) times, and obtaining the extended sequences X*, Y*, the method further comprises:
  storing the $(N+1)^{th}$ bit to the $(N+25)^{th}$ bit of the extended sequences X*, Y*.

4. The method according to claim 1, wherein, the step of generating the scrambling code according to the extended sequences X*, Y* and the phase offset column vectors comprises:
  obtaining N phase offset continuous $C_{long,1,x,n}$ according to a formula $C_{long,1,x,n}[i]=\hat{\ }(X^*[i+24: i] \& C_{long,1,x,n}$ phase offset column vector);
  obtaining N phase offset continuous $C_{long,2,x,n}$ according to a formula $C_{long,2,x,n}[i]=\hat{\ }(X^*[i+24: i] \& C_{long,2,x,n}$ phase offset column vector);
  obtaining N phase offset continuous $C_{long,1,y,n}$ according to a formula $C_{long,1,y,n}[i]=\hat{\ }(Y^*[i+24: i] \& C_{long,1,y,n}$ phase offset column vector);
  obtaining N phase offset continuous $C_{long,2,y,n}$ according to a formula $C_{long,2,y,n}[i]=\hat{\ }(Y^*[i+24: i] \& C_{long,2,y,n}$ phase offset column vector); and
  generating the scrambling code $C_{long,n}$; wherein, the real part of the scrambling code $C_{long,n}$ is: $Re[C_{long,n}[i]]=C_{long,1,x,n}[i]\hat{\ }C_{long,1,y,n}[i]$, and the imaginary part is: $Im[C_{long,n}[i]]=(-1)^i \times C_{long,1,x,n}[i]\hat{\ }C_{long,1,y,n}[i]\hat{\ }C_{long,2,x,n}[(2\lfloor i/2 \rfloor)]\hat{\ }C_{long,2,y,n}[(2\lfloor i/2 \rfloor)]$, wherein, $0\leq i<N$.

5. The method according to claim 1, wherein, the N is a positive integer that is greater than 0 and less than 2560.

6. The method according to claim 2, wherein, the N is a positive integer that is greater than 0 and less than 2560.

7. The method according to claim 3, wherein, the N is a positive integer that is greater than 0 and less than 2560.

8. The method according to claim 4, wherein, the N is a positive integer that is greater than 0 and less than 2560.

9. An apparatus for generating a scrambling code, comprising:
  a first acquiring module, which is configured to acquire initial sequences X0, Y0 in the following way: according to the current user number, read median values of sequences X, Y of a user by using an association relation between the user number and the median values of the sequences X, Y; and
  judge whether the user in the current processing period produces the scrambling code for the first time, if yes, select the initially configured sequences X, Y as the initial sequences X0, Y0; and if not, select the read median values of the sequences X, Y as the initial sequences X0, Y0;
  an extension module, which is configured to extend the initial sequences X0, Y0 acquired by the first acquiring module for ($\lfloor N/M \rfloor+1$) times, and obtain extended sequences X*, Y*; wherein, the N is a positive integer, $0<M\leq 22$, and "$\lfloor\ \rfloor$" denotes rounded down;
  a second acquiring module, which is configured to acquire phase offset column vectors; and
  a generation module, which is configured to generate the scrambling code according to the sequences X*, Y* extended by the extension module and the phase offset column vectors acquired by the second acquiring module.

10. The apparatus according to claim 9, wherein, in order to extend for the initial sequences X0, Y0 for ($\lfloor N/M \rfloor+1$) times to obtain the extended sequences X*, Y*, the extension module is configured to:
  make $\lfloor N/M \rfloor+1$ be j, $0<q\leq j$; and
  extend the initial sequences X0, Y0 for j times, so that the $0^{th}$ bit to the $(24+M\times(q-1))^{th}$ bit of a sequence Xq after the $q^{th}$ time' extension is the same as the $0^{th}$ bit to the $(24+M\times(q-1))^{th}$ bit of a sequence X(q-1) after the $(q-1)^{th}$ time' extension, the $(25+M\times(q-1)+k)^{th}$ bit of the sequence Xq is a result by adding model 2 of the $(M\times(q-1)+k)^{th}$ bit and the $(M\times(q-1)+k+3)^{th}$ bit of the sequence X(q-1); and a sequence Yq after the $q^{th}$ time' extension is the same as the $0^{th}$ bit to the $(24+M\times(q-1))^{th}$ bit of a sequence Y(q-1) after the $(q-1)^{th}$ time' extension, the $(25+M\times(q-1)+k)^{th}$ bit of the sequence Yq is a result by adding model 2 of the $(M\times(q-1)+k)^{th}$ bit, the $(M\times(q-1)+k+1)^{th}$ bit, the $(M\times(q-1)+k+2)^{th}$ bit and the $(M\times(q-1)+k+3)^{th}$ bit of the sequence $Y(q-1)$; wherein, $0\le k\le 21$.

11. The apparatus according to claim 9, further comprising: a storage module, which is configured to store the $(N+1)^{th}$ bit to the $(N+25)^{th}$ bit of the extended sequences $X^*, Y^*$.

12. The apparatus according to claim 9, wherein, the generation module comprises:

a first generation module, which is configured to: obtain N phase offset continuous $C_{long,1,x,n}$ according to a formula $C_{long,1,x,n}[i]=\hat{}(X^*[i+24: i]\ \&\ C_{long,1,x,n}$ phase offset column vector); obtain N phase offset continuous $C_{long,2,x,n}$ according to a formula $C_{long,2,x,n}[i]\hat{}(X[i+24: i]\ \&\ C_{long,2,x,n}$ phase offset column vector); obtain N phase offset continuous $C_{long,1,y,n}$ according to a formula $C_{long,1,y,n}[i]=\wedge(Y^*[i+24: i]\ \&\ C_{long,1,y,n}$ phase offset column vector); and obtain N phase offset continuous $C_{long,2,y,n}$ according to a formula $C_{long,2,y,n}[i]=\hat{}(Y^*[i+24: i]\ \&\ C_{long,2,y,n}$ phase offset column vector); and a second generation module, which is configured to: generate the scrambling code $C_{long,n}$; wherein, the real part of the scrambling code $C_{long,n}$ is: $Re[C_{long,n}[i]]=C_{long,1,x,n}[i]\hat{}C_{long,1,y,n}[i]$, and the imaginary part is: $Im[C_{long,n}[i]]=(-1)^i\times C_{long,1,x,n}[i]\hat{}C_{long,1,y,n}[i]\hat{}C_{long,2,x,n}[(2\lfloor i/2\rfloor)]\hat{}C_{long,2,y,n}[(2\lfloor i/2\rfloor)]$, wherein, $0\le i<N$.

\* \* \* \* \*